No. 658,433. Patented Sept. 25, 1900.
K. GEIER.
ROCKING DEVICE.
(Application filed Apr. 2, 1900.)

(No Model.)

Witnesses
Inventor
Karl Geier
By Wm. E. Poulter,
Attorney

THE NORRIS PETERS CO., PHOTO-LITHO., WASHINGTON, D. C.

UNITED STATES PATENT OFFICE.

KARL GEIER, OF PULKAU, AUSTRIA-HUNGARY.

ROCKING DEVICE.

SPECIFICATION forming part of Letters Patent No. 658,433, dated September 25, 1900.

Application filed April 2, 1900. Serial No. 11,193. (No model.)

*To all whom it may concern:*

Be it known that I, KARL GEIER, a citizen of Austria-Hungary, residing at Pulkau, in the Province of Lower Austria, Empire of Austria-Hungary, have invented certain new and useful Improvements in Rocking Devices; and I do hereby declare the following to be a full, clear, and exact description of the invention, such as will enable others skilled in the art to which it appertains to make and use the same.

The present invention relates to a rocking device in which the rocking movement set up by the person actuating the rocker becomes translated into an intermittent forward progression of the entire structure. A suitable steering device may be provided for controlling the direction of travel.

The accompanying drawings illustrate two examples of rocking-horses made according to the present invention.

Figure 1:
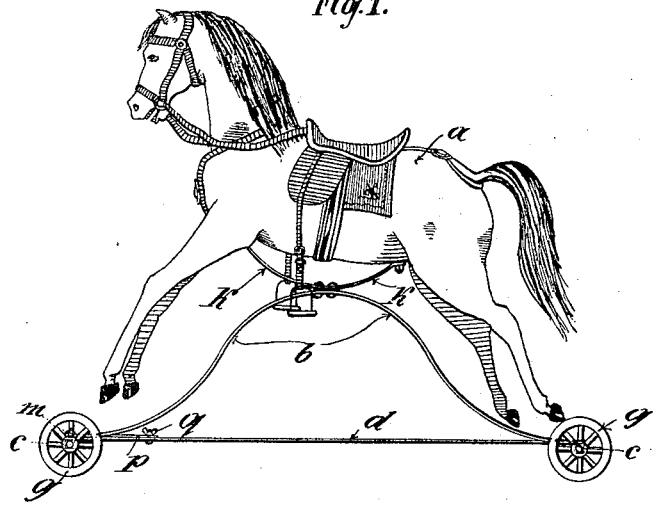
Figure 2:
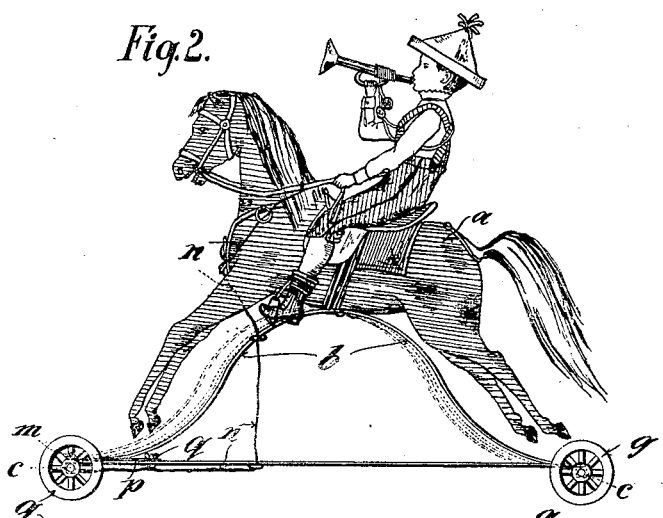
Figure 3:
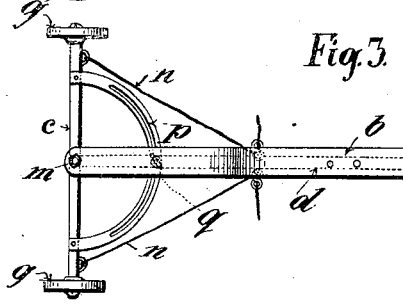
Figure 4:
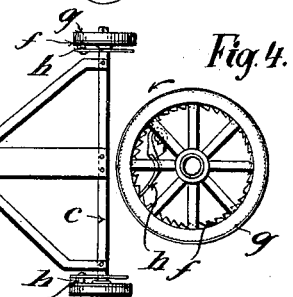

Figure 1 is a side view of the one modification. Fig. 2 is a side view of the second modification; Fig. 3, a plan view, and Fig. 4 a detail.

The seat for the reception of a person or persons, which may be fitted out as an ordinary seat, an animal-figure, basket, vehicle, or small boat, &c., is supported and securely fastened by rivets, for example, on an arched leaf-spring composed of one or more arched laminated flat springs $b$, the ends of which are curved in the reverse direction to the middle part and secured to the cross-pieces or axles $c$ $c$ at each end of a light frame $d$, mounted on wheels, so that the seat, figure, &c., may be rocked, causing the arms or ends of the said spring to become alternately distorted. Thus when rocking toward the rear the center of gravity falls alternately on the rear or front portion of the construction, producing components of power in the forward and backward direction and causing an alternate forward and backward movement of the entire frame. In order to avoid that, during the forward rocking the entire construction is moved backwardly by the backward component of power. The wheels on which the whole is mounted, and more particularly the rear wheels $g$, are provided with ratchet-movements $f$, which only allow the translation of the rocking movement into a progressive movement in one and the same direction. For this purpose the rear wheels turn loosely on their axles, whereby pawls $h$ engage with the ratchet-teeth of their corresponding wheel and allow only a forward movement of the whole and preventing at the same time the ratchet-pawls from sliding on the fixed teeth during the forward movement.

In a modification of the above arrangement, Fig. 1, the seat is supported by a kind of leaf-spring $k$, which is secured on the lower leaf-spring. The spring action, and therefore also the forward progressive power, is considerably greater with this modification of construction.

In order to enable the device to be steered, the front axle is fixed on the frame turnable on a pivot $m$ and can be turned by means of reins or cords $n$ $n$ either to one side or the other, or it may be fixed on a certain radius by means of a guide or band $p$ and set-screw $q$ or other suitable device. The shape, size, and fitting out of the seat $a$, which, as already stated above, can be an ordinary seat, an animal-figure, saddle, basket, open or closed vehicle-body, or small boat, &c., as well as the construction of the supporting-frame, are of course not limited to any particular design and may be varied. Likewise the laminated springs may have other varieties of springs substituted therefor.

I claim—

In a device of the character described, the combination with a frame $d$, axles mounted in opposite ends of the frame, the forward axle being pivotally mounted in the frame, and wheels mounted on the axles, the wheels on the rear axle being loosely mounted thereon, of an arched spring secured at its ends to the axles, a figure supported upon the arched portion of the spring, ratchet-teeth carried by each of the said loosely-mounted wheels, a pawl device carried at each end of the rear axle and adapted to engage the teeth to prevent backward rotation of the said wheels but permit forward rotation of the same, a curved band $p$ secured to the front axle and means adapted to fix the said band rigidly to the frame $d$ in different positions.

In testimony whereof I affix my signature in presence of two witnesses.

KARL GEIER.

Witnesses:
  WILHELM C. ZEROD,
  ALVESTO S. HOGUE.